United States Patent
Nazemi et al.

(10) Patent No.: US 10,295,230 B2
(45) Date of Patent: *May 21, 2019

(54) THERMOELECTRIC COOLING MANAGEMENT

(71) Applicant: Sensors Unlimited, Inc., Princeton, NJ (US)

(72) Inventors: Jonathan Nazemi, Doylestown, PA (US); Michael Delamere, Pennington, NJ (US); Marc Hansen, Hamilton, NJ (US); Jinguo Yu, Flemington, NJ (US)

(73) Assignee: Sensors Unlimited, Inc., Princeton, NJ (US)

( * ) Notice: Subject to any disclaimer, the term of this patent is extended or adjusted under 35 U.S.C. 154(b) by 288 days.

This patent is subject to a terminal disclaimer.

(21) Appl. No.: 15/099,958

(22) Filed: Apr. 15, 2016

(65) Prior Publication Data

US 2017/0299236 A1    Oct. 19, 2017

(51) Int. Cl.
*F25B 21/02*    (2006.01)
*H04N 5/33*    (2006.01)

(52) U.S. Cl.
CPC ............... *F25B 21/02* (2013.01); *H04N 5/33* (2013.01)

(58) Field of Classification Search
CPC .................................. F25B 21/02; H04N 5/33
USPC ..................................................... 250/339.04
See application file for complete search history.

(56) References Cited

U.S. PATENT DOCUMENTS

| | | | |
|---|---|---|---|
| 4,587,563 A | 5/1986 | Bendell et al. | |
| 6,504,155 B1 | 1/2003 | Ookawa | |
| 7,235,785 B2 | 6/2007 | Hornback et al. | |
| 7,679,048 B1 | 3/2010 | Aziz et al. | |
| 2011/0315881 A1* | 12/2011 | Knowles | H04N 5/243 250/352 |
| 2012/0050539 A1* | 3/2012 | Naimi | H04N 5/2252 348/164 |
| 2014/0139643 A1 | 5/2014 | Hogasten et al. | |
| 2017/0138788 A1* | 5/2017 | Nazemi | G01J 1/4228 |
| 2017/0142297 A1* | 5/2017 | Nazemi | H04N 5/2176 |
| 2017/0195599 A1* | 7/2017 | Nazemi | H04N 5/33 |

* cited by examiner

*Primary Examiner* — David P Porta
*Assistant Examiner* — Gisselle M Gutierrez
(74) *Attorney, Agent, or Firm* — Locke Lord LLP; Scott D. Wofsy; Joshua L. Jones

(57) ABSTRACT

A method of controlling FPA system stabilization includes calculating FPA adjustments as a function of FPA temperature and adjusting a TEC set point to assist the FPA adjustments in attaining a predetermined level of FPA performance. Adjusting the TEC set point can include adjusting the TEC set point as a function of at least one of ambient temperature, FPA temperature, or disparity between the predetermined level of FPA performance and a level of FPA performance obtainable by calculating the FPA adjustments as a function of FPA temperature alone without adjusting the TEC set point.

16 Claims, 3 Drawing Sheets

THERMOELECTRIC COOLING MANAGEMENT

BACKGROUND OF THE INVENTION

1. Field of the Invention

The present disclosure relates to imaging, and more particularly to focal plane arrays such as used in imaging systems.

2. Description of Related Art

A typical focal plane array (FPA) has a system gain and dark level that are not constant as a function of temperature. System gain and dark level are important in producing accurate image data, and since the temperature of an FPA varies, e.g., based on changes in the environment external to the imaging system as well as changes in temperature due to changes in operation within an imaging system, variation in temperature can present a challenge to creating accurate image data. A typical solution for this problem is to utilize thermoelectric cooling to control the temperature of the FPA. As long as the thermoelectric cooling maintains a constant, known temperature at the FPA, and as long as the correct system gain and dark level at that temperature are known, the FPA can be used to produce accurate image data.

A typical focal plane array (FPA) also has pixel to pixel variation in behavior due to manufacturing variance and the like. This variation is typically addressed by calibrating each pixel and saving the pixel by pixel calibration data as a correction map used to correct signals from the pixels to produce accurate image data. Pixel performance varies as a function of temperature, and so the temperature at which the correction map is created is the temperature at which the system generates the most accurate images—changes in temperature at the FPA will reduce the effectiveness of the correction map. A typical solution for this problem is to use thermoelectric cooling to control the temperature of the FPA as described above. As long as the thermoelectric cooling maintains a constant, known temperature at the FPA, and using a correction map that corresponds to that known temperature, the FPA can be used to produce accurate image data regardless of ambient temperature.

Such conventional methods and systems have generally been considered satisfactory for their intended purpose. However, there is still a need in the art for improved imaging techniques. The present disclosure provides a solution for this need.

SUMMARY OF THE INVENTION

A method of controlling FPA system stabilization includes calculating FPA adjustments as a function of FPA temperature and adjusting a TEC set point to assist the FPA to provide a predetermined level of FPA performance. FPA performance can include noise, dark current, capacity, dynamic range, noise equivalent irradiance, or any other suitable electro-optical capability.

Adjusting the TEC set point can include adjusting the TEC set point as a function of at least one of ambient temperature, FPA temperature, or disparity between the predetermined level of FPA performance and a level of FPA performance obtainable by calculating the FPA adjustments as a function of FPA temperature alone without adjusting the TEC set point. Adjusting the TEC set point can include prompting a user to approve adjusting TEC set point to reach the predetermined level of FPA performance. It is also contemplated that adjusting the TEC set point can include automatically adjusting the TEC set point.

Calculating FPA adjustments can include determining the FPA temperature, calculating an FPA system gain as a function of the FPA temperature, and applying the FPA system gain at the FPA temperature to condition output of the FPA to produce temperature independent image data at the TEC set point. Calculating FPA adjustments can also include calculating a non-uniformity correction map on a pixel by pixel basis for the FPA, wherein non-uniformity correction for each pixel is a function of the FPA temperature, and applying the non-uniformity correction map to the imaging data from the FPA to produce temperature dependent non-uniformity corrected image data at the TEC set point.

Calculating the non-uniformity correction map can include a process that does not itself perform a system gain correction in calculating the non-uniformity correction map. Calculating the FPA system gain can include calculating the FPA system gain as a function of system gain for the FPA at a reference temperature and empirically derived coefficients. Non-uniformity correction for each pixel can be a function with empirically derived coefficients.

Applying the FPA system gain can include applying the FPA system gain to a ROIC operatively connected to the FPA to condition electrical signals from the FPA for imaging. The method can include receiving imaging data from the FPA which can include transmitting the imaging data to the ROIC from the FPA, wherein the ROIC is operatively connected to the FPA to condition electrical signals from the FPA for imaging. Applying the non-uniformity correction map to the imaging data can include applying the non-uniformity correction map to the imaging data from the ROIC.

Applying the FPA system gain and applying the non-uniformity correction map can be performed without controlling the temperature of the FPA. Calculating the FPA system gain can be governed by $$Vgain(T)=[(p1+p3*Tref)*Vgainref+p2*(Tref-T)]/(p1+p3*T)$$

wherein Vgain is a variable control level which correlates to the FPA system gain, Vgainref is the value of the control level which sets the FPA system gain at the reference temperature (Tref), and p1, p2, and p3 are empirically derived coefficients.

Calculating a non-uniformity correction map on a pixel by pixel basis can be governed by $$\delta Ic = [p0 + p1 \times \log10(T)] \times \left( Iraw - \sum_{n=0,1,3,5} \left( a_n \times \left( \frac{T - T_{min}}{T_{max} - T_{min}} \right)^n \right) \right)$$

wherein δIc represents the change for a respective pixel from its dark level to a desired correction value, Iraw is the raw value of the pixel in digital numbers, Tmax and Tmin are maximum and minimum temperatures, respectively, for normalizing FPA temperature T, and p0, p1, and a0, a1, a3, and a5 are empirically derived coefficients.

An imaging system includes a focal plane array (FPA), a thermoelectric cooler (TEC), a temperature sensor operatively connected to measure temperature of the FPA, and a module. The module is operatively connected to the FPA, TEC, and temperature sensor to calculate FPA adjustments as a function of FPA temperature including at least one of:

calculating FPA system gain for the FPA as a function of the FPA temperature, system gain for the FPA at a reference temperature, and empirically derived coefficients, and to apply the FPA system gain to condition output of the FPA to produce temperature independent image data; or applying a non-uniformity correction map on a pixel by pixel basis for the FPA as a function of the FPA temperature and empirically derived coefficients, and to apply the non-uniformity correction map to condition output of the FPA to produce temperature dependent non-uniformity corrected image data.

The module is also operatively connected to the FPA, TEC, and temperature sensor to adjust the set point of the TEC to assist the FPA adjustments in attaining a predetermined level of FPA performance.

A ROIC can be operatively connected to the FPA to condition electrical signals from the FPA for imaging, wherein the module is operatively connected to the FPA through the ROIC, wherein applying the FPA system gain includes applying the FPA system gain to the ROIC, and wherein applying the non-uniformity correction map to the imaging data includes applying the non-uniformity correction map to the imaging data from the ROIC.

The FPA can include a current mirror pixel architecture. It is also contemplated that the FPA can include an InGaAs material for infrared imaging.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
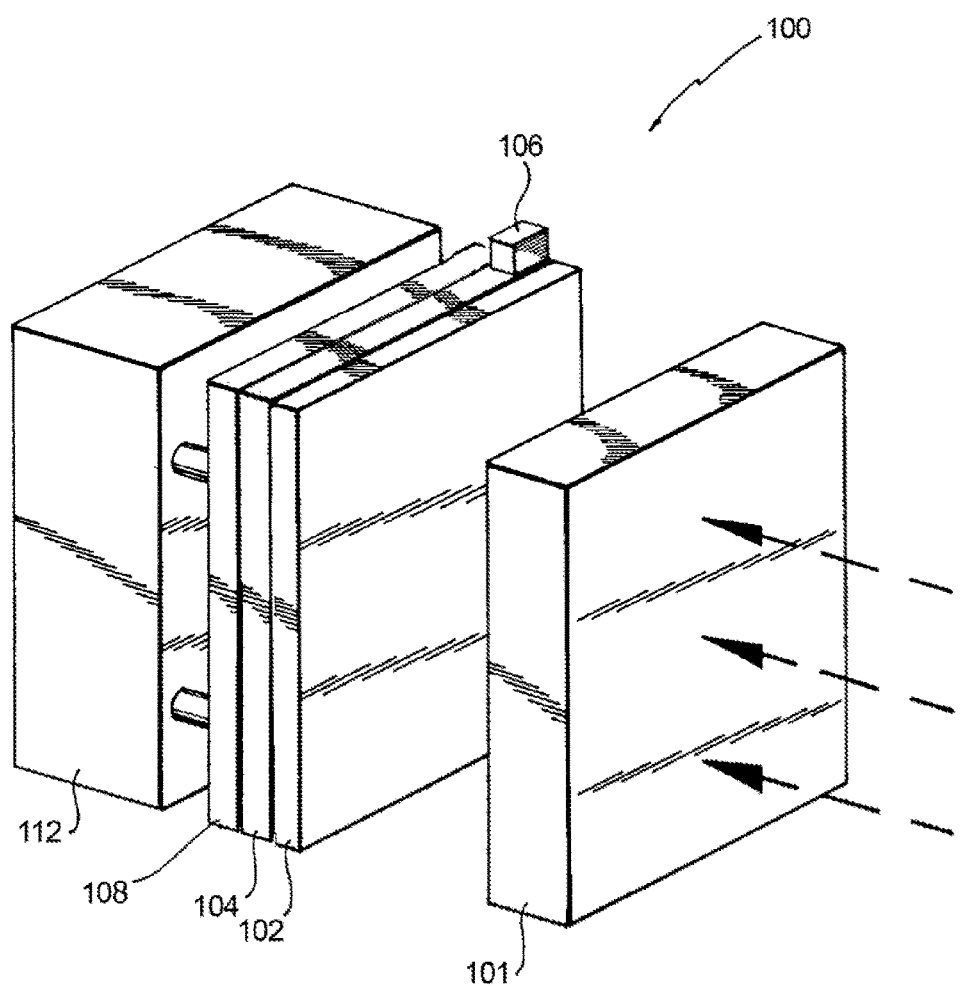
FIG. 1 is a schematic view of an exemplary embodiment of an imaging system constructed in accordance with the present disclosure, showing the focal plane array (FPA) and thermoelectric cooler (TEC)

Reference will now be made to the drawings wherein like reference numerals identify similar structural features or aspects of the subject disclosure. For purposes of explanation and illustration, and not limitation, a partial view of an exemplary embodiment of an imaging system in accordance with the disclosure is shown in FIG. 1 and is designated generally by reference character 100. Other embodiments of imaging systems in accordance with the disclosure, or aspects thereof, are provided in FIGS. 2-3, as will be described. The systems and methods described herein can be used for accurate imaging using non-temperature controlled focal plane arrays.

Imaging system 100 includes a focal plane array (FPA) 102, and lens optics 101 for focusing images on FPA 102, as indicated by the three large arrows in FIG. 1. FPA 102 can be of any suitable array type, for example a two-dimensional array with a 640 by 512 grid of pixels. However, any other suitable array configuration, including one-dimensional arrays, can be used without departing from the scope of this disclosure.

A Read-Out Integrated Circuit (ROIC) 104 is operatively connected to the array of sensor 102 to condition electrical signals from the array for imaging. A temperature sensor 106 is operatively connected to ROIC 104. As the FPA 102 and ROIC 104 are in relative temperature equilibrium, temperature sensor 106 provides sufficient temperature readings to accurately represent the temperature of FPA 102. ROIC 104 is operatively connected to FPA 102 to condition electrical signals from the array for imaging. A thermoelectric cooler (TEC) 108 is operatively connected to ROIC 104 to cool FPA 102. A module 112 is operatively connected to ROIC 104, TEC 108, and FPA 102. The module 112 provides electronic architecture such that signals from ROIC 104 can be conditioned for signal output, and analyzed with embedded logic such as that within a field programmable gate array (FPGA). Within module 112, the new control value Vgain, described further below, is calculated based on input from ROIC 104. The new control value is then set in ROIC 104 to achieve the desired level of gain compensation. In some circumstances, there is no need for TEC 108 for temperature control of FPA 102, however, TEC 108 is available to assist the calculations for FPA adjustments in gain and non-uniformity correction described herein, as needed to attain a desired or predetermined level of FPA performance. FPA performance can include noise, dark current, capacity, dynamic range, noise equivalent irradiance, or any other suitable electro-optical capability.

The set point for TEC 108 is controlled using a temperature feedback algorithm which adjusts the TEC set point to achieve reduced or minimal power consumption while providing improved performance relative to what would be achieved without the TEC 108. Thus imaging system 100 can utilize little or no power in TEC 108 at lower temperatures, and can still avoid the performance degradation that could otherwise impair performance of FPA 102 in the absence of TEC 108 assisting. TEC 108 allows for imaging system 100 to have a higher performance at higher temperatures than would be possible without TEC 108 assisting the calculated FPA adjustments.

FPA 102 can include a buffered current mirror pixel architecture, or any other suitable architecture. It is also contemplated that FPA 102 can include an InGaAs material for infrared imaging.

A method of controlling FPA system stabilization, e.g., in imaging system 100, includes calculating FPA adjustments as a function of FPA temperature and adjusting a TEC set point, e.g., for TEC 108 to assist the FPA adjustments in attaining a predetermined level of FPA performance, e.g., for FPA 102.

Adjusting the TEC set point can include adjusting the TEC set point as a function of at least one of ambient temperature, FPA temperature, or disparity between the predetermined level of FPA performance and a level of FPA performance obtainable by calculating the FPA adjustments as a function of FPA temperature alone without adjusting the TEC set point. Adjusting the TEC set point can include prompting a user to approve adjusting TEC set point to reach the predetermined level of FPA performance. It is also contemplated that adjusting the TEC set point can include automatically adjusting the TEC set point.

Calculating FPA adjustments can include determining the FPA temperature, e.g., using temperature sensor 106, and calculating an FPA system gain as a function of the FPA temperature, the system gain for the FPA at a reference temperature, and empirically derived coefficients. The method also includes applying the FPA system gain at the FPA temperature to condition output of the FPA to produce temperature independent image data, which can be output, e.g., by module 112, at the TEC set point.

The function of the FPA temperature, system gain for the FPA at the reference temperature, and empirically derived coefficients can incorporate approximating change in system gain at the FPA temperature compared to the system gain at the reference temperature. The reference temperature can be room temperature, e.g., 20° C. or any other suitable temperature.

As a function of the FPA system gain, Vgain, and temperature, T, let Z be defined as follows:

$$Z = \log(\Delta Response/\Delta Power)$$

where ΔResponse is the change in electro-optical response given change in incident optical power ΔPower. A model of the form shown below can be used to approximate the system performance wherein temperature T varies:

$$Z = p0 + p1 \cdot Vgain + p2 \cdot T + p3 \cdot Vgain \cdot T$$

where p0, p1, p2, and p3 are constants that can be calibrated for a given system. This model can be used for calculating FPA system gain. For example, solving the equation immediately above for Vgain and substituting the value for Z obtained at a known reference temperature where Vgain is known, provides a formula for calculating the FPA system gain as a function of the FPA temperature, system gain for the FPA at a reference temperature, and empirically derived coefficients:

$$Vgain(T) = [(p1 + p3*Tref)*Vgainref + p2*(Tref - T)]/(p1 + p3*T)$$

wherein Vgain is a variable control level which correlates to the FPA system gain, Vgainref is the value of the control level which sets the FPA system gain at the reference temperature (Tref), and p1, p2, and p3 are empirically derived coefficients. The units of temperature are arbitrary as long as they are consistent, and may be reported, e.g., in Kelvin, Celsius, or digital numbers such as a 12-bit integer. The coefficients p1, p2, and p3 can thus be determined to allow the formula to work on any temperature scale.

Figure 2:
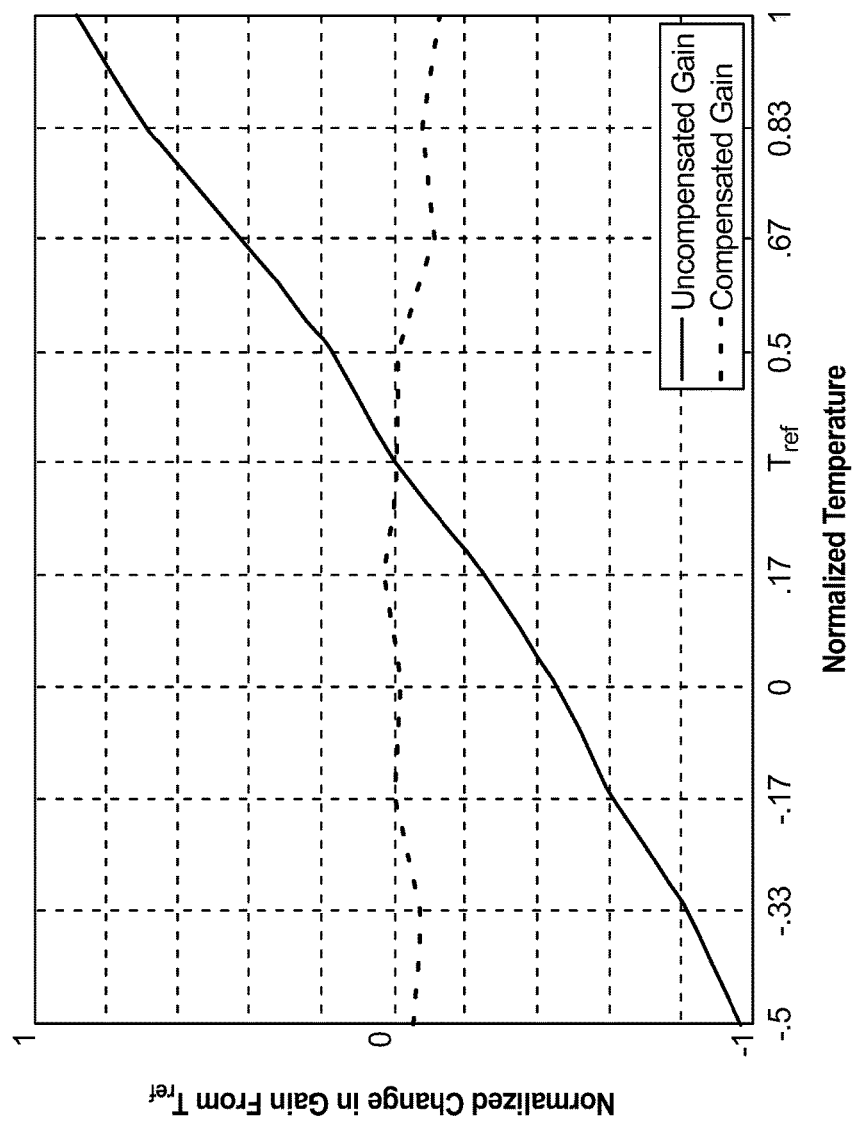
FIG. 2 is a graph for comparing system gain in non-temperature controlled FPAs over a range of temperatures with and without compensation in accordance with embodiments in the present disclosure.

With reference now to FIG. 2, two plots are shown for system gain in a non-temperature controlled FPA. One plot is for uncompensated gain, and one is for compensated gain, and each is on the same normalized scale for comparison. The vertical scale is normalized change in system gain from the system gain at Tref. The horizontal scale is normalized temperature, and Tref is identified on the horizontal axis. The plot for uncompensated gain varies considerably as a function of temperature. By contrast, the plot for compensated gain shows that when system gain is temperature compensated as disclosed herein, the system gain can remain substantially constant over a range of temperatures. This demonstrates that the systems and methods disclosed herein provide for substantially constant system gain for non-temperature controlled FPAs over a range of temperatures.

Those skilled in the art will readily appreciate that the methods described herein can be implemented using machine readable instructions to carry out the operations described herein, e.g., executed in a module for executing machine readable instructions such as module 112 supporting imaging system 100.

Calculating FPA adjustments can also include determining an FPA temperature, e.g., using sensor 106, and calculating a non-uniformity correction map on a pixel by pixel basis for the FPA, e.g., FPA 102, wherein the non-uniformity correction for each pixel is a function of the FPA temperature and empirically derived coefficients. The method also includes applying the non-uniformity correction map at the FPA temperature to condition output of the FPA to produce temperature dependent non-uniformity corrected image data at the TEC set point, which can be output, e.g., by module 112.

The function of the FPA temperature, system non-uniformity correction at the reference temperature, and empirically derived coefficients can incorporate approximating change in a respective pixel's dark level to a desired correction. Traditional non-uniformity correction utilizes a model that corrects pixels from an absolute reference, meaning the pixel is corrected to be at a digital level for an input digital level and temperature pair. In contrast, the model used herein utilizes an approach that corrects a given pixel in a relative reference, meaning the pixel is corrected to minimize the difference from the normal. The change in gain from an offset is smooth and significantly easier to model. The following calculations are derived from a model that reduces or minimizes non-uniformity and number of calibration coefficients.

Calculating a non-uniformity correction map on a pixel by pixel basis, wherein the non-uniformity correction for each pixel is a function of the FPA temperature and empirically derived coefficients can be governed by $$\delta Ic = [p0 + p1 \times \log 10(T)] \times \left( Iraw - \sum_{n=0,1,3,5} \left( a_n \times \left( \frac{T - T_{min}}{T_{max} - T_{min}} \right)^n \right) \right)$$

wherein δIc represents the change for a respective pixel from its dark level to a desired correction value, T is the FPA temperature in digital numbers, Iraw is the raw value of the pixel in digital numbers, Tmax and Tmin are maximum and minimum temperatures, respectively, for normalizing temperature T, e.g., maximum and minimum operating temperatures, and p0, p1, and a0, a1, a3, and a5 are empirically derived coefficients. Systems and methods as described herein can be used to correct pixel by pixel non-uniformity over a range of FPA temperatures and light levels.

Figure 3:
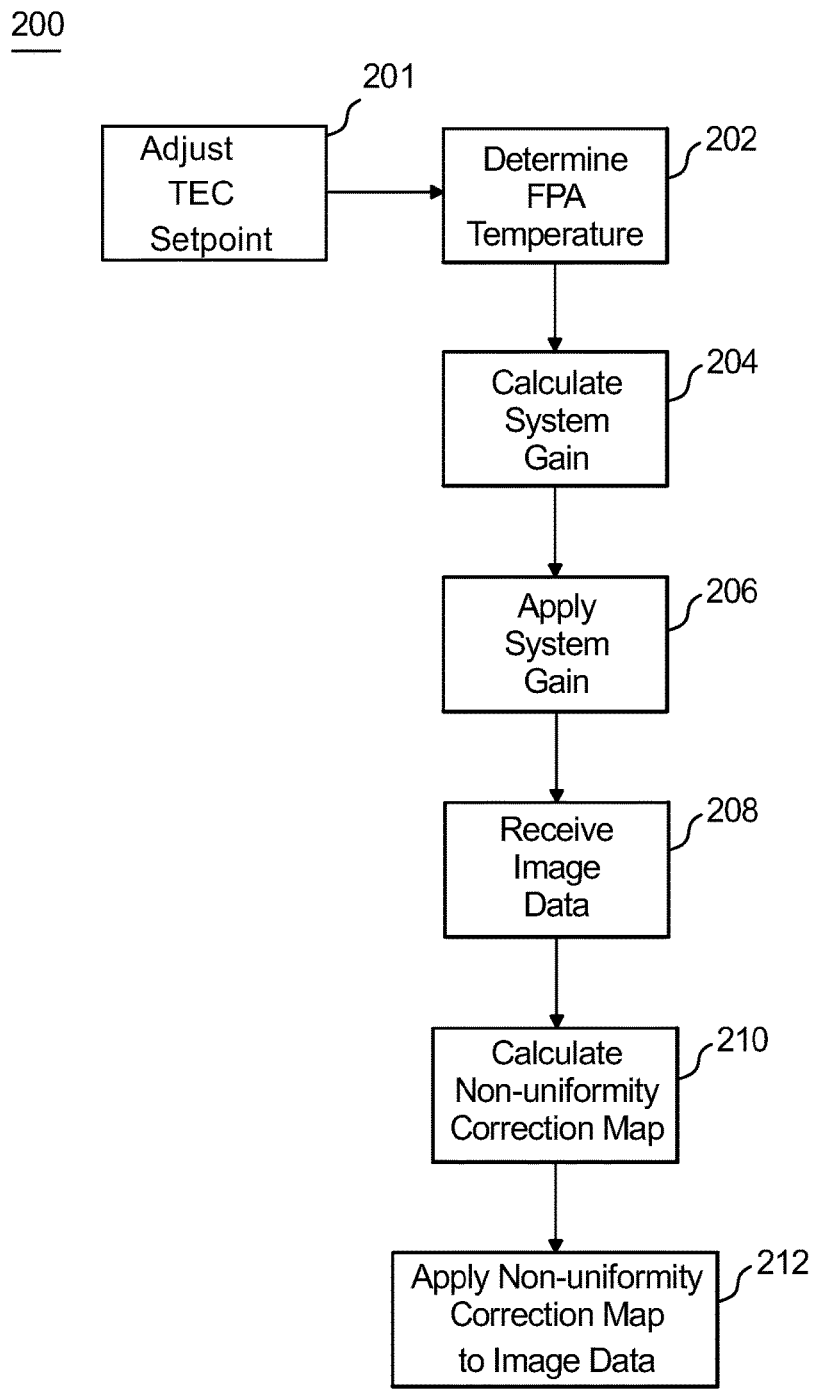
FIG. 3 is a diagram of an exemplary embodiment of a method in accordance with the present disclosure, showing use of gain normalization and pixel non-uniformity correction together to enable imaging over a range of temperatures in a TEC assisted imaging system.

With reference now to FIG. 3, it is also contemplated that if system gain corrections are made for temperature variation in TEC assisted imaging systems, such corrections can advantageously reduce the digital footprint for non-uniformity corrections as disclosed herein. A method 200 of controlling FPA system stabilization includes adjusting a TEC set point, as indicated by box 201, to assist in FPA adjustments attaining a predetermined level of FPA performance. This can include determining an FPA temperature, as indicated by box 202, e.g., using a temperature sensor such as sensor 106. Method 200 also includes calculating an FPA system gain as a function of the FPA temperature as described above, and applying the FPA system gain at the FPA temperature to condition output of the FPA to produce temperature independent image data, as indicated by boxes 204 and 206, respectively.

Applying the FPA system gain includes applying the FPA system gain to a ROIC, e.g., ROIC 104. Method 200 can include receiving imaging data from the FPA, as indicated by box 208. This can include transmitting the imaging data to the ROIC from the FPA. The image data can be received by the ROIC from the FPA with the system gain already applied to the ROIC.

The method also includes calculating a non-uniformity correction map on a pixel by pixel basis for the FPA, as indicated by box 210, wherein non-uniformity correction for each pixel is a function as described above. Calculating the non-uniformity correction map includes a process that does not itself perform a system gain correction in calculating the non-uniformity correction map. The system gain correction process described above relieves the need that there would otherwise be within the non-uniformity correction process to calculate system gain, which is what provides the potential advantages described above for reducing the digital footprint of non-uniformity corrections.

The non-uniformity map can be applied to the imaging data from the ROIC, as indicated by box 212. The system gain can be calculated in a module, e.g., module 112, and applied by the module to the ROIC. The non-uniformity corrections can be calculated in a module, e.g., module 112, and applied to the imaging data within module 112.

The module is thus operatively connected to the FPA through the ROIC for system gain and non-uniformity corrections with no need for a temperature control device connected for temperature control of the FPA. The two processes, one for system gain control and the other for non-uniformity correction, can be agnostic of each other or the results of each other, and can thus be performed in parallel with one another.

Potential advantages of utilizing systems and methods as disclosed herein include the fact that temperature control in the TEC need only partially controls temperature of the FPA, so any remaining FPA temperature variation due to only partial TEC temperature control can be system-gain-corrected using techniques as disclosed herein, and in which case any remaining FPA temperature induced non-uniformity can be corrected using techniques as disclosed herein. This reduces the demand temperature control devices to remove a major contributor to power consumption and hardware size. It also expands the operating envelope for imaging devices utilizing temperature dependent gain and/or non-uniformity correction, since TEC temperature control can be used as needed to keep temperatures within the practical limits of the gain and/or non-uniformity correction schemes.

The methods and systems of the present disclosure, as described above and shown in the drawings, provide for imaging systems with superior properties including reducing or eliminating the need for temperature control, while providing accurate imaging data over a range of ambient temperatures. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A method of controlling FPA system stabilization comprising:
   calculating FPA adjustments as a function of FPA temperature; and
   adjusting a TEC set point to assist the FPA adjustments in attaining a predetermined level of FPA performance, wherein calculating FPA adjustments includes:
   determining an FPA temperature;
   calculating an FPA system gain as a function of the FPA temperature;
   applying the FPA system gain at the FPA temperature to condition output of the FPA to produce temperature independent image data at the TEC set point;
   calculating a non-uniformity correction map on a pixel by pixel basis for the FPA, wherein non-uniformity correction for each pixel is a function of the FPA temperature; and
   applying the non-uniformity correction map to the imaging data from the FPA to produce temperature dependent non-uniformity corrected image data at the TEC set point, wherein calculating the non-uniformity correction map includes a process that does not itself perform a system gain correction in calculating the non-uniformity correction map.

2. A method as recited in claim 1, wherein adjusting the TEC set point includes adjusting the TEC set point as a function of at least one of ambient temperature, FPA temperature, or disparity between the predetermined level of FPA performance and a level of FPA performance obtainable by calculating the FPA adjustments as a function of FPA temperature alone without adjusting the TEC set point.

3. A method as recited in claim 1, wherein adjusting the TEC set point includes prompting a user to approve adjusting TEC set point to reach the predetermined level of FPA performance.

4. A method as recited in claim 1, wherein adjusting the TEC set point includes automatically adjusting the TEC set point.

5. The method as recited in claim 1, wherein calculating the FPA system gain includes calculating the FPA system gain as a function of system gain for the FPA at a reference temperature and empirically derived coefficients.

6. The method as recited in claim 1, wherein non-uniformity correction for each pixel is a function of empirically derived coefficients.

7. The method as recited in claim 1, wherein applying the FPA system gain includes applying the FPA system gain to a ROTC operatively connected to the FPA to condition electrical signals from the FPA for imaging.

8. The method as recited in claim 1, further comprising:
   receiving the imaging data from the FPA, wherein receiving imaging data from the FPA includes transmitting the imaging data to the ROIC from the FPA, wherein the ROIC is operatively connected to the FPA to condition electrical signals from the FPA for imaging.

9. The method as recited in claim 8, wherein applying the non-uniformity correction map to the imaging data includes applying the non-uniformity correction map to the imaging data from the ROIC.

10. A method of controlling FPA system stabilization comprising:
    calculating FPA adjustments as a function of FPA temperature; and
    adjusting a TEC set point to assist the FPA adjustments in attaining a predetermined level of FPA performance, wherein calculating FPA adjustments includes:
    determining an FPA temperature;
    calculating an FPA system gain as a function of the FPA temperature;

applying the FPA system gain at the FPA temperature to condition output of the FPA to produce temperature independent image data at the TEC set point;

calculating a non-uniformity correction map on a pixel by pixel basis for the FPA, wherein non-uniformity correction for each pixel is a function of the FPA temperature; and applying the non-uniformity correction map to the imaging data from the FPA to produce temperature dependent non-uniformity corrected image data at the TEC set point, wherein calculating the FPA system gain is governed by $$Vgain(T) = [(p1 + p3*Tref)*Vgainref + p2*(Tref-T)]/(p1+p3*T)$$

wherein Vgain is a variable control level which correlates to the FPA system gain, Vgainref is the value of the control level which sets the FPA system gain at the reference temperature (Tref), and p1, p2, and p3 are empirically derived coefficients.

11. A method of controlling FPA system stabilization comprising:

calculating FPA adjustments as a function of FPA temperature; and adjusting a TEC set point to assist the FPA adjustments in attaining a predetermined level of FPA performance, wherein calculating FPA adjustments includes:

determining an FPA temperature;

calculating an FPA system gain as a function of the FPA temperature;

applying the FPA system gain at the FPA temperature to condition output of the FPA to produce temperature independent image data at the TEC set point;

calculating a non-uniformity correction map on a pixel by pixel basis for the FPA, wherein non-uniformity correction for each pixel is a function of the FPA temperature; and applying the non-uniformity correction map to the imaging data from the FPA to produce temperature dependent non-uniformity corrected image data at the TEC set point, wherein calculating a non-uniformity correction map on a pixel by pixel basis is governed by $$\delta Ic = [p0 + p1 \times \log10(T)] \times \left(Iraw - \sum_{n=0,1,3,5} \left(a_n \times \left(\frac{T-T_{min}}{T_{max}-T_{min}}\right)^n\right)\right)$$

wherein δIc represents the change for a respective pixel from its dark level to a desired correction value, Iraw is the raw value of the pixel in digital numbers, Tmax and Tmin are maximum and minimum temperatures, respectively, for normalizing FPA temperature T, and p0, p1, and a0, a1, a3, and a5 are empirically derived coefficients.

12. An imaging system comprising:
a focal plane array (FPA);
a thermoelectric cooler (TEC) operatively connected to cool the FPA;
a temperature sensor operatively connected to measure temperature of the FPA; and
a module operatively connected to the FPA, TEC, and temperature sensor to:
calculate FPA adjustments as a function of FPA temperature by:
calculating FPA system gain for the FPA as a function of the FPA temperature, system gain for the FPA at a reference temperature, and empirically derived coefficients, and to apply the FPA system gain to condition output of the FPA to produce temperature independent image data; or
applying a non-uniformity correction map on a pixel by pixel basis for the FPA as a function of the FPA temperature and empirically derived coefficients, and to apply the non-uniformity correction map to condition output of the FPA to produce temperature dependent non-uniformity corrected image data, wherein the non-uniformity correction map calculated with a process that does not itself perform a system gain correction in calculating the non-uniformity correction map; and
adjust set point of the TEC to assist the FPA adjustments in attaining a predetermined level of FPA performance.

13. The system as recited in claim 12, further comprising a ROIC operatively connected to the FPA to condition electrical signals from the FPA for imaging, wherein the module is operatively connected to the FPA through the ROIC, wherein applying the FPA system gain includes applying the FPA system gain to the ROIC, and wherein applying the non-uniformity correction map to the imaging data includes applying the non-uniformity correction map to the imaging data from the ROIC.

14. The system as recited in claim 12, wherein the FPA includes a current mirror pixel architecture.

15. The system as recited in claim 12, wherein the FPA includes an InGaAs material for infrared imaging.

16. A system as recited in claim 12, wherein adjusting the TEC set point includes automatically adjusting the TEC set point as a function of at least one of ambient temperature, FPA temperature, or disparity between the predetermined level of FPA performance and a level of FPA performance obtainable by calculating the FPA adjustments as a function of FPA temperature alone without adjusting the TEC set point.

* * * * *